United States Patent
Malhotra

(10) Patent No.: US 10,932,098 B1
(45) Date of Patent: Feb. 23, 2021

(54) MOBILITY MANAGEMENT ENTITY SELECTION BY ESTABLISHMENT CAUSE

(71) Applicant: Sprint Communications Company L.P., Overland Park, KS (US)

(72) Inventor: Rajil Malhotra, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 29 days.

(21) Appl. No.: 15/897,746

(22) Filed: Feb. 15, 2018

(51) Int. Cl.
  *H04W 4/16* (2009.01)
  *H04W 76/50* (2018.01)
  *H04W 56/00* (2009.01)
  *H04M 3/56* (2006.01)

(52) U.S. Cl.
  CPC .............. *H04W 4/16* (2013.01); *H04M 3/56* (2013.01); *H04W 56/001* (2013.01); *H04W 76/50* (2018.02)

(58) Field of Classification Search
  CPC ..... H04W 4/16; H04W 76/50; H04W 56/001; H04M 3/56
  See application file for complete search history.

(56) References Cited

U.S. PATENT DOCUMENTS

| | | | |
|---|---|---|---|
| 8,238,909 B2 | 8/2012 | Guo et al. | |
| 8,509,163 B2 | 8/2013 | Guo et al. | |
| 9,106,382 B1* | 8/2015 | Ray | H04W 4/90 |
| 9,191,865 B1* | 11/2015 | Paczkowski | H04W 12/02 |
| 9,392,584 B2 | 7/2016 | Gauba et al. | |
| 2010/0135246 A1 | 6/2010 | Hallental | |
| 2011/0270609 A1* | 11/2011 | Jones | H04M 3/56 704/235 |
| 2013/0003697 A1 | 1/2013 | Adjakple et al. | |
| 2013/0109359 A1* | 5/2013 | Bergmann | H04W 4/16 455/412.1 |
| 2016/0262068 A1* | 9/2016 | Won | H04W 36/0011 |
| 2016/0381699 A1* | 12/2016 | Rubin | H04L 1/00 370/329 |
| 2017/0019934 A1* | 1/2017 | Yang | H04L 61/1529 |
| 2017/0238278 A1* | 8/2017 | Yadav | H04W 68/04 370/329 |
| 2018/0192234 A1* | 7/2018 | Mohamed | H04L 69/40 |
| 2018/0343167 A1* | 11/2018 | Malhotra | H04W 48/18 |

* cited by examiner

Primary Examiner — Omer S Mian
Assistant Examiner — Nizam U Ahmed

(57) ABSTRACT

A wireless access point supports media conferencing for wireless User Equipment (UE). The wireless access point wirelessly exchanges timing signaling with the wireless UE to synchronize the wireless UE. After the wireless UE is synchronized, the wireless access point wirelessly exchanges connect signaling with the wireless UE to receive an Establishment Cause and a Wireless Network Identifier from the wireless UE. The wireless access point selects a media conferencing Mobility Management Entity (MME) when the Establishment Cause is associated with the media conferencing MME. The wireless access point selects a data MME based on the Wireless Network Identifier when the Establishment Cause is not associated with the media conferencing MME. The wireless access point exchanges network signaling with the data MME or the media conferencing MME. The wireless access point wirelessly exchanges user data with the wireless UE under control of the data MME or the media conferencing MME.

10 Claims, 7 Drawing Sheets

MOBILITY MANAGEMENT ENTITY SELECTION BY ESTABLISHMENT CAUSE

TECHNICAL BACKGROUND

Wireless data networks serve wireless user devices with mobile data communication services like internet access, voice calling, and video calling. The wireless data networks have wireless access points that exchange data over the air with wireless user devices. The wireless data networks have network gateways that exchange the data between the wireless access points and other systems to support the mobile data communication services. The wireless data networks also have network controllers that direct the data communications over the wireless access points and the network gateways.

In Long Term Evolution (LTE) networks, the wireless access points comprise evolved NodeBs (eNodeBs), the network controllers comprise Mobility Management Entities (MMEs), and the network gateways comprise Serving Gateways (SGWs) and Packet Data Network Gateways (PGWs). The eNodeBs exchange data over the air with wireless User Equipment (UEs). The eNodeBs exchange the data with the SGWs which exchange the data with the PGWs—all under the control of the MMEs.

To attach the wireless UE to the LTE network, the LTE eNodeBs wirelessly broadcast a list of Public Land Mobile Network Identifiers (PLMN IDs). When an LTE UE attaches to the eNodeB, the UE selects and transfers one of these broadcast PLMN IDs back to the eNodeB. The eNodeB then selects the MME for that UE based on the broadcast PLMN ID that was received back from the UE. The eNodeB then signals the selected MME on behalf of the UE.

Voice over LTE (VoLTE) uses an Internet Multimedia Subsystem (IMS) to support a packet-based voice calling service. After an LTE UE is attached to the LTE network, the UE registers its IP address with the IMS. The LTE UE may then place or receive VoLTE calls by exchanging SIP messages with the IMS over the LTE network. The UE exchanges voice data packets for the VoLTE calls over the LTE network.

The UE may place emergency VoLTE calls by exchanging SIP messages with the IMS over the LTE network. The LTE UE exchanges then voice data packets for the emergency VoLTE calls with a Public Safety Answering Point (PSAP) over the LTE network. For these emergency VoLTE calls, the wireless UEs include an Emergency Establishment Cause along with the PLMN ID during attachment.

Unfortunately, the LTE UE may select the wrong PLMN ID from the broadcast PLMN list to support an emergency VoLTE call. For example, the UE may select a PLMN ID that is not associated with a VoLTE MME. In these scenarios, the UE would be attached to an MME that has not been optimized for emergency VoLTE calls.

Technical Overview

A wireless access point supports media conferencing for wireless User Equipment (UE). The wireless access point wirelessly exchanges timing signaling with the wireless UE to synchronize the wireless UE. After the wireless UE is synchronized, the wireless access point wirelessly exchanges connect signaling with the wireless UE to receive an Establishment Cause and a Wireless Network Identifier from the wireless UE. The wireless access point selects a media conferencing Mobility Management Entity (MME) when the Establishment Cause is associated with the media conferencing MME. The wireless access point selects a data MME based on the Wireless Network Identifier when the Establishment Cause is not associated with the media conferencing MME. The wireless access point exchanges network signaling with the data MME or the media conferencing MME. The wireless access point wirelessly exchanges user data with the wireless UE under control of the data MME or the media conferencing MME.

DETAILED DESCRIPTION

Figure 1:
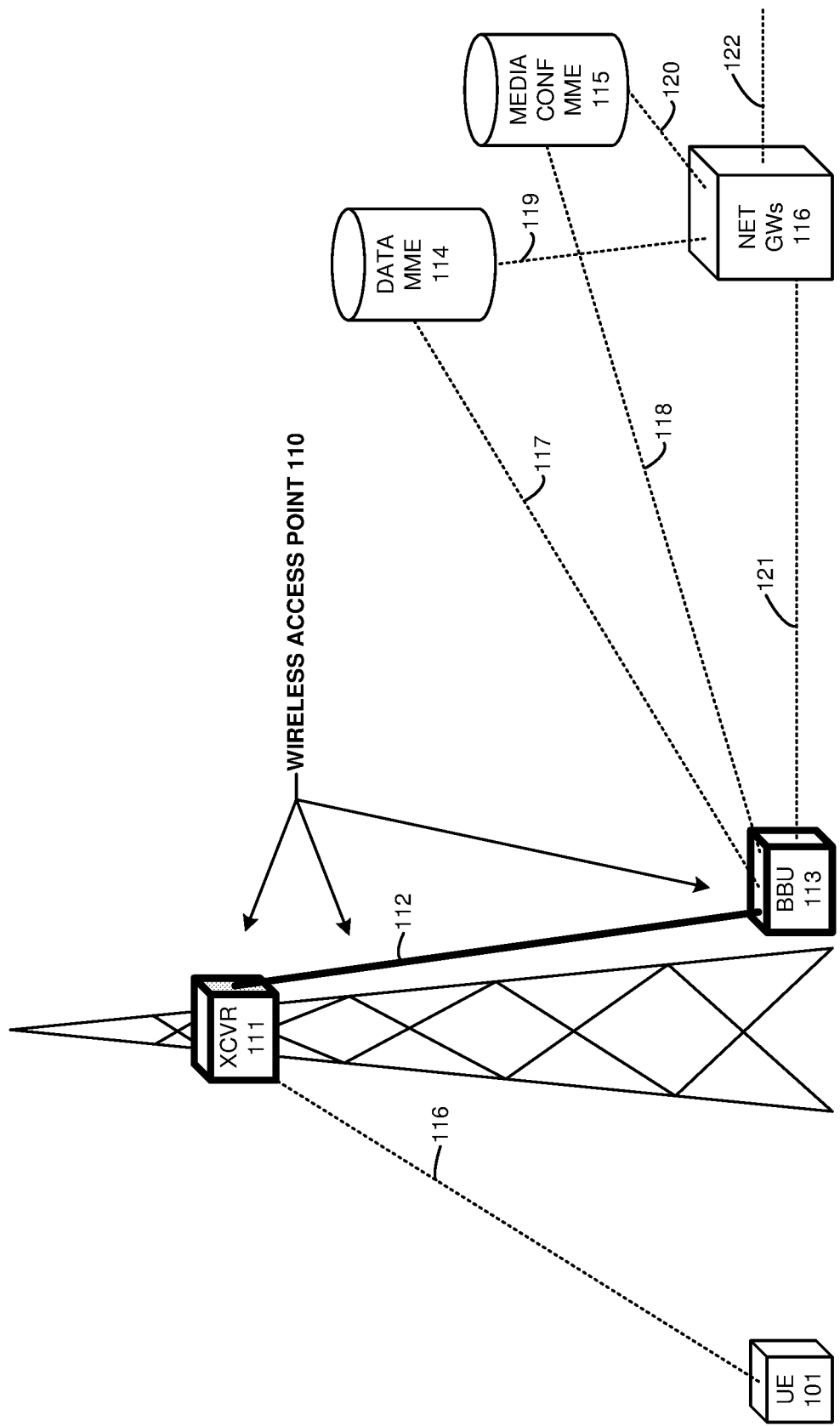
FIG. 1 illustrates a wireless access point to support media conferencing for wireless User Equipment (UE).

FIG. 1 illustrates wireless access point 110 to support media conferencing for wireless User Equipment (UE) 101. Wireless UE 101 could be a computer, phone, headset, graphic display, or some other media conferencing apparatus having a wireless transceiver. Wireless access point 110 comprises wireless transceiver circuitry (XCVR) 111, data link 112, and baseband unit circuitry (BBU) 113.

Wireless XCVR 111 comprises antennas, modulators, amplifiers, filters, digital/analog interfaces, Digital Signal Processors (DSPs), Random Access Memory (RAM), persistent data storage, firmware/software, and bus interfaces. Wireless XCVR 111 and wireless UE 101 use wireless network protocols like Fifth Generation New Radio (5G NR), Long Term Evolution (LTE), and Institute of Electrical and Electronic Engineers (IEEE) 802.11 (Wifi).

Wireless XCVR 111 and baseband unit circuitry 113 communicate over data link 112. Data link 112 uses a data communication protocol like Common Public Radio Interface (CPRI), IEEE 802.3 (Ethernet), bus protocol, Internet Protocol (IP), General Purpose Radio Service Transfer Protocol (GTP), Data over Cable System Interface Specification (DOCSIS), Wave Division Multiplexing (WDM), Wifi, LTE, 5G NR, or some other data coupling—including combinations thereof.

BBU 113 comprises Central Processing Units (CPUs), RAM, persistent data storage, and bus interfaces. BBU 113 also comprises data networking Input/Output (I/O) ports and/or wireless transceiver components (antennas, modulators, amplifiers, filters, digital/analog interfaces, and DSPs). BBU 113 further comprises software like operating systems and modules for Physical layer (PHY), Media Access Control (MAC), Radio Link Control (RLC), Packet Data Convergence Protocol (PDCP), Radio Resource Control (RRC), S1, GTP, IP, and other networking modules.

BBU 313 communicates with data Mobility Management Entity (MME) 114 over S1-MME signaling link 117. BBU 313 communicates with media conferencing (CONF) MME 115 over S1-MME signaling link 118. BBU 313 communicates with Network Gateways (NET GWs) 116 over S1-U data links 121. Data MME 114 and Network GWs 116 communicate over S11 signaling link 119. Media conferencing MME 115 and Network GWs 116 communicate over S11 signaling link 120. Network GWs 116 communicate with external systems over SGi data links 122. Links 117-122 use transport protocols like IP, Ethernet, GTP, DOCSIS, WDM, Wifi, LTE, 5G NR, and the like—including combinations thereof.

In some examples, media conferencing MME 115 comprises a Voice-over-Long Term Evolution (VoLTE) MME and/or a Video-over-Long Term Evolution (ViLTE) MME. A VoLTE/ViLTE MME supports VoLTE/ViLTE services by managing a Session Initiation Protocol (SIP) signaling link between wireless UE 101 and an Internet Multimedia Subsystem (IMS). A VoLTE/ViLTE MME also manages IP voice/video links between wireless UE 101 and network gateways 116. A VoLTE/ViLTE MME has signaling interfaces to a Gateway Mobility Location Center (GMLC) and an evolved Service Mobility Location Center (eSMLC).

XCVR 111 and BBU 113 comprise computer hardware and software that are configured and integrated together to form a special-purpose machine—a wireless access point that improves media conferencing by selecting media conferencing MMEs based on the attachment Establishment Cause from wireless UEs. The computer hardware comprises processing circuitry like CPUs, DSPs, Graphical Processing Units (GPUs), transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like Control Units (CUs), Logic Units (LUs), and Random Access Memory (RAM). In turn, the CUs, LUs, and RAM are metallically connected to form CPUs, DSPs, GPUs, transceivers, bus circuitry, and memory.

In the computer hardware, the CUs drive data between the RAM and the LUs, and the LUs operate on the data. The CUs also drive interactions with external memory like flash drives, disk drives, and the like. The computer hardware executes machine-level software to control and move data by driving machine-level inputs like voltages and currents to the CUs, LUs, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware into the special-purpose wireless relays described herein.

In operation, XCVR 111 wirelessly exchanges timing signaling with wireless UE 101 over link 116 to synchronize the uplink and possibly the downlink for wireless UE 101. After synchronizing wireless UE 101, XCVR 111 wirelessly exchanges connect signaling with wireless UE 101 over wireless link 116 to receive an Establishment Cause and a Wireless Network Identifier from wireless UE 101.

When the Establishment Cause from UE 101 has been pre-associated with media conferencing MME 115, BBU 113 exchanges network signaling for wireless UE 101 with media conferencing MME 115 over S1-MME link 118. Examples of Establishment Causes that may be associated with media conferencing MME 115 include an Emergency Establishment Cause, Non-Internet Protocol Signaling Establishment Cause, and perhaps other Establishment Causes. XCVR 111 wirelessly exchanges media conference data with wireless UE 101 over wireless link 116 under the control of BBU 113 and media conferencing MME 115. XCVR 111 and BBU exchange the media conference data over data link 112. BBU 113 exchanges the media conference data with network gateways 116 over S1-U data link 121 under the control media conferencing MME 114.

When the Establishment Cause from UE 101 has not been pre-associated with media conferencing MME 115, BBU 113 selects data MME 114 from a set of MMEs based on the Wireless Network Identifier from UE 101. The Wireless Network Identifier might be a Public Land Mobile Network Identifier (PLMN ID) that was broadcast by XCVR 111. BBU 113 exchanges network signaling for wireless UE 101 with selected data MME 114 over S1-MME link 117. Examples of Establishment Causes that are not associated with media conferencing MME 115 include a Mobile Originated Signaling Establishment Cause, Mobile Originated Data Establishment Cause, and perhaps other Establishment Causes. XCVR 111 wirelessly exchanges user data with wireless UE 101 over wireless link 116 under the control of BBU 113 and data MME 114. XCVR 111 and BBU exchange the user data over data link 112. BBU 113 exchanges the user data with network gateways 116 over S1-U data link 121 under the control of data MME 114.

Thus, wireless access point 110 selects MMEs based on the Wireless Network Identifiers from the UEs unless a UE transfers a special Establishment Cause that has been pre-associated with media conferencing MME 115. Advantageously, wireless access point 110 automatically couples wireless UEs to special media conferencing MME 115 responsive to a special Establishment Cause from the wireless UEs. In these cases, wireless access point 110 does not select the MME based on the wireless network identifier.

Figure 2:
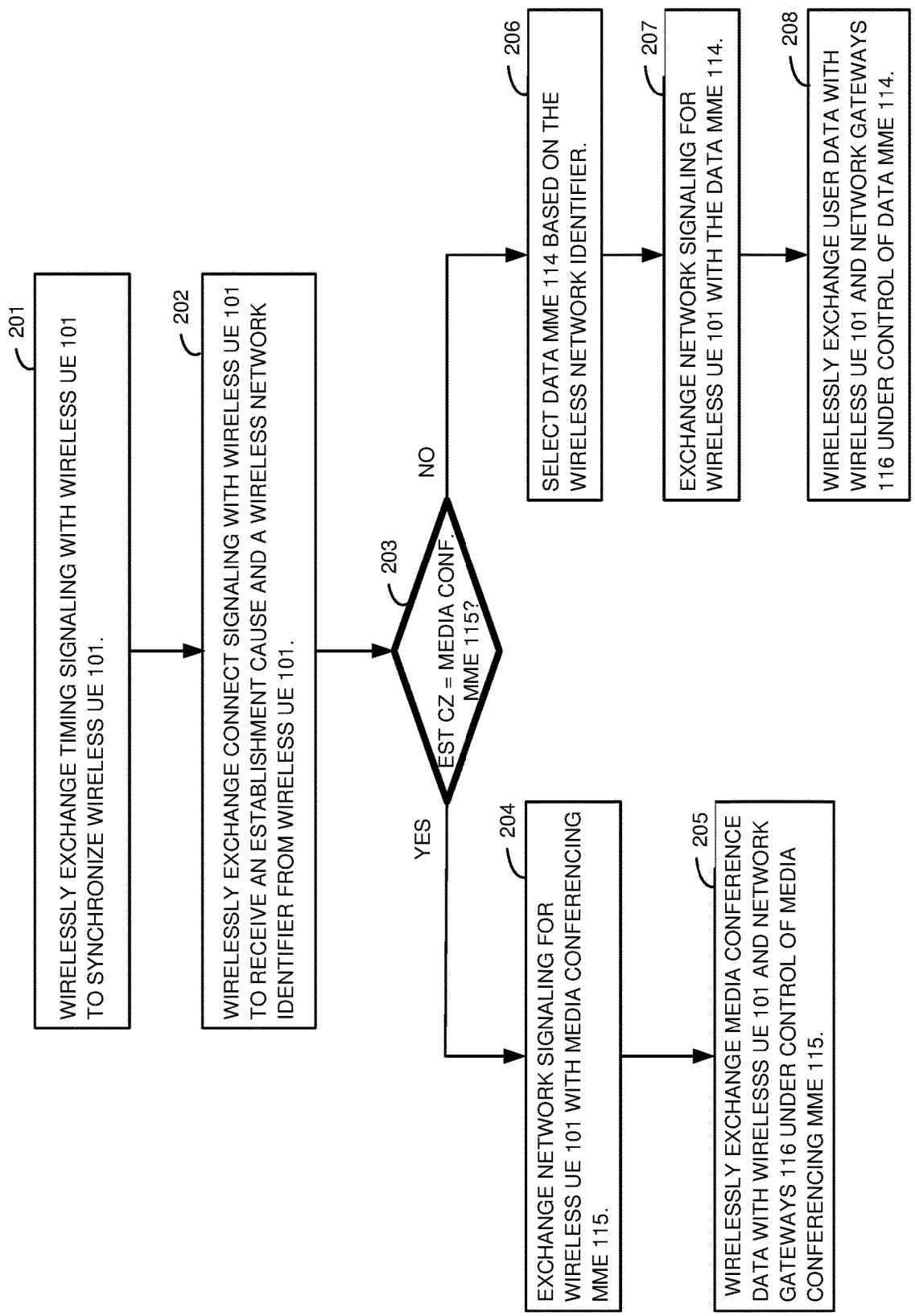
FIG. 2 illustrates the operation of the wireless access point to support media conferencing for a wireless UE.

FIG. 2 illustrates the operation of wireless access point 110 to support media conferencing for wireless UE 101. Wireless access point 110 wirelessly exchanges timing signaling with wireless UE 101 to synchronize wireless UE 101 (201). After synchronizing wireless UE 101, wireless access point 110 wirelessly exchanges connect signaling with wireless UE 101 to receive an Establishment Cause and a Wireless Network Identifier from wireless UE 101 (202).

If the Establishment Cause from UE 101 has been pre-associated with media conferencing MME 115 (203), then wireless access point 110 exchanges network signaling for wireless UE 101 with media conferencing MME 115 (204). For example, an Emergency Establishment Cause from UE 101 could drive wireless access point 110 to invoke media conferencing MME 115 for wireless UE 101. Wireless access point 110 wirelessly exchanges user data with wireless UE 101 under the control of media conferencing MME 115 (205).

If the Establishment Cause from UE 101 has not been pre-associated with media conferencing MME 115 (203), then wireless access point 110 selects data MME 114 based on the Wireless Network Identifier (206) and exchanges network signaling for wireless UE 101 with data MME 114 (207). For example, a Mobile Originated Emergency Establishment Cause from UE 101 may drive wireless access point 110 to select data MME 114 based on the wireless network identifier. Wireless access point 110 wirelessly exchanges user data with wireless UE 101 under the control of data MME 114 (208). Advantageously, wireless access point 110 automatically couples wireless UE 101 to special media conferencing MME 115 responsive to a special Establishment Cause like an Emergency Cause.

Figure 3:
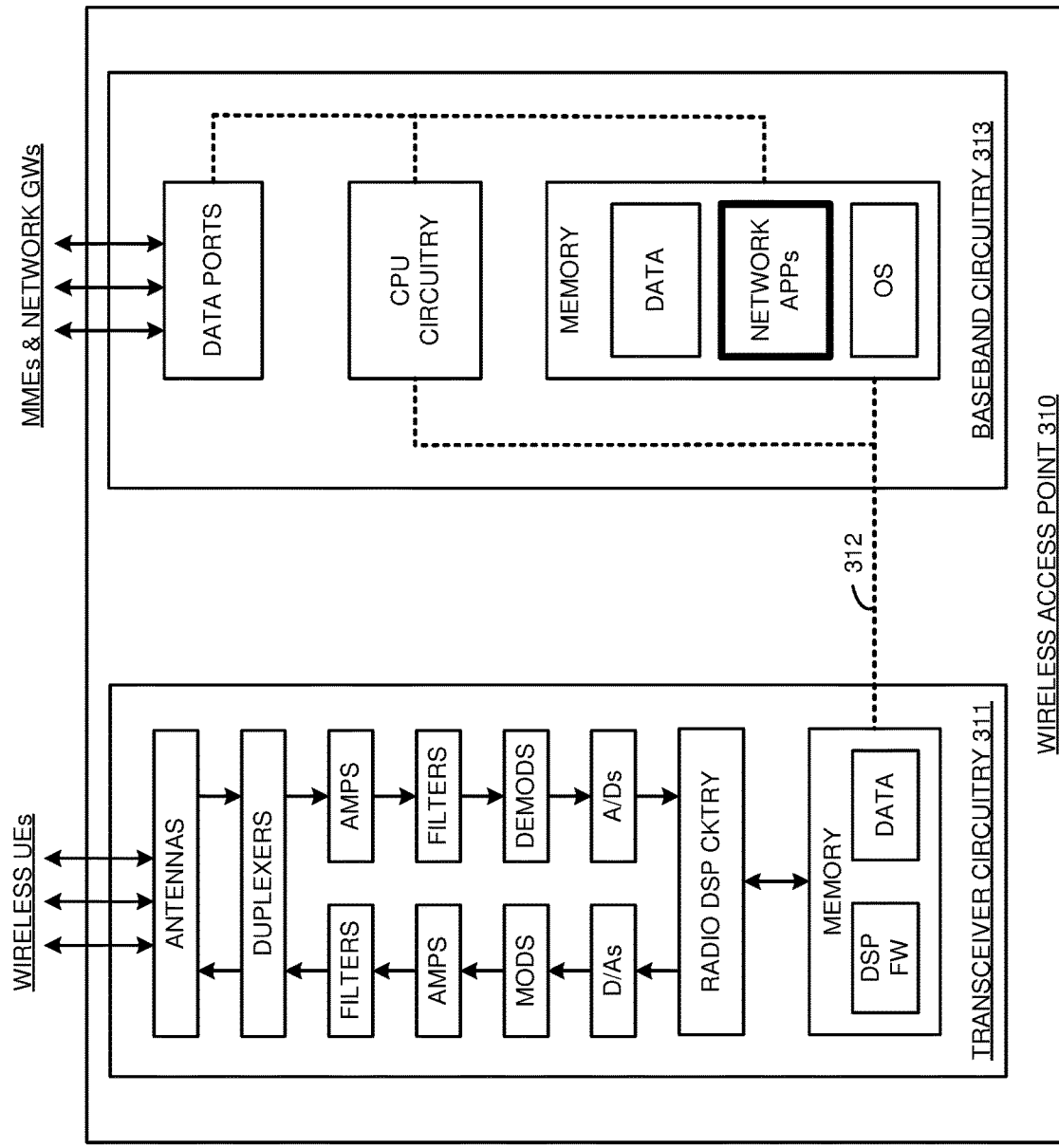
FIG. 3 illustrates hardware for a wireless access point to support media conferencing for a wireless UE.

FIG. 3 illustrates hardware for wireless access point 310 that supports media conferencing for wireless UEs. Wireless access point 310 is an example of wireless access point 110, although access point 110 may have other configurations and operations. Wireless access point 310 comprises transceiver circuitry 311, data link 312, and baseband circuitry 313.

Transceiver circuitry 311 comprises antennas, duplexers, modulators, filters, amplifiers (AMPS), Analog-to-Digital converters (A/Ds), Digital-to-Analog converters (D/As), radio DSP circuitry, memory, and bus interfaces. The memory stores data and DSP firmware (FW). In transceiver circuitry 311, the radio DSP circuitry executes the DSP FW to drive the wireless exchange of the data with the wireless UEs. Data link 112 comprises a CPRI link, IEEE 802.3 link, IP link, or some other data coupling—including combinations thereof.

Baseband circuitry 313 comprises data ports, CPU circuitry, memory, and bus interfaces. The memory stores data, operating system software (OS), and network application software (APPs). The data ports comprise transceiver circuitry to support IEEE 802.3, IP, GTP, S1-MME, S1-U, and the like. In baseband circuitry 313, the CPU circuitry executes the operating system and network applications to control the exchange of the data between the wireless UEs and the network gateways (GWs) under the control of the MMEs.

Figure 4:
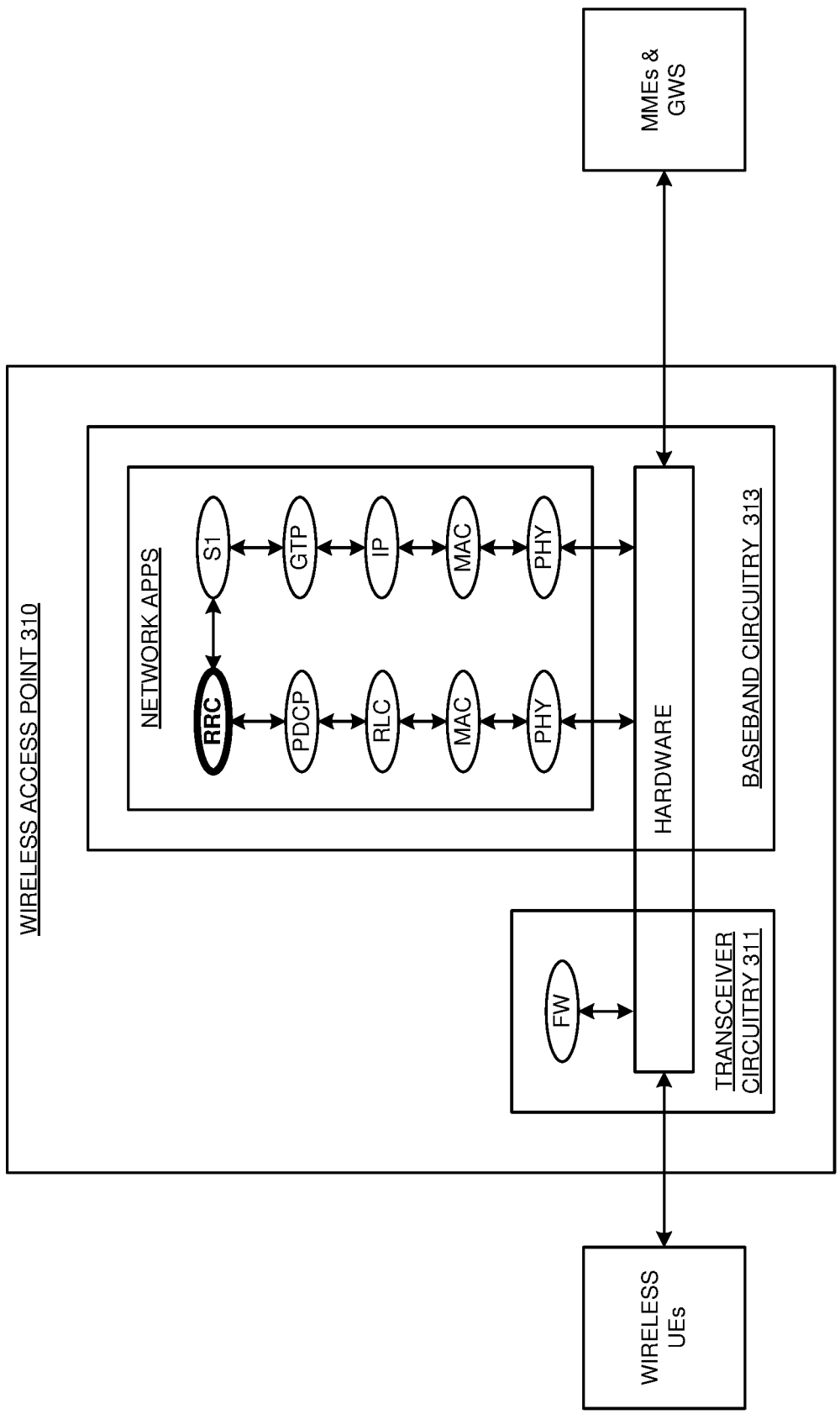
FIG. 4 illustrates software for the wireless access point to support media conferencing for a wireless UE.

FIG. 4 illustrates the network application software for wireless access point 310 that supports media conferencing for wireless UEs. Wireless access point 310 is shown with transceiver circuitry 311 and baseband circuitry 313. The hardware represents the circuitry shown on FIG. 3 (DSP, CPU, bus, memory, filter, amplifier, antennas, modulation, and the like). The DSP hardware in transceiver circuitry 311 executes the FW to drive wireless data communication with the wireless UEs.

The CPU hardware in baseband circuitry 313 executes the network applications. Starting from the network-side and proceeding to the user-side, the network applications comprise a physical module (PHY) coupled to a Media Access Control module (MAC). The MAC is coupled to an IP module (IP), and the IP is coupled to a General Purpose Radio Service Transfer Protocol module (GTP). The GTP is coupled to an S1 module (S1) which is coupled to a Radio Resource Control module (RRC). The RRC is coupled to a Packet Data Convergence Protocol module (PDCP). The PDCP is coupled to a Radio Link Control module (RLC), and the RLC is coupled to another MAC. This MAC is coupled to another PHY. In baseband circuitry 313, the two PHYs call the OS to drive the hardware to support the data communications.

Referring to FIG. 3, the antennas in transceiver circuitry 313 receive a wireless signal and transfer corresponding electrical signals through the duplexer to the amplifier. The amplifier boosts the received signal for the filter which attenuates unwanted energy. A demodulator demodulates the amplified and filtered signal from the carrier frequency. An analog-to-digital converter converts the demodulated analog receive signal into a digital receive signal for the radio DSP circuitry. The radio DSP circuitry recovers data from the receive signal and transfers the recovered data to memory. The recovered data includes the user attachment signaling indicating an Establishment Cause and a Wireless Network Identifier. The CPU circuitry executes the OS to process the received data through the network applications—PHY, MAC, RLC, PDCP, and RRC.

Referring to FIG. 4, the RRC determines if the Establishment Cause is pre-associated with a media conferencing MME. If the Establishment Cause is not pre-associated with the media conferencing MME, then the RRC selects an MME based on the Wireless Network Identifier from the wireless UE. The RRC transfers an initial UE message to the S1 for delivery to the selected MME. The S1 transfers the initial UE signaling to the selected MME over an S1-MME link that traverses the GTP, IP, MAC, and PHY to the baseband circuitry 313 hardware. The baseband circuitry 313 hardware transfers the initial UE signaling to the selected MME.

The S1 subsequently receives S1-MME signaling from the selected MME over baseband circuitry 313 hardware and the PHY, MAC, IP, and GTP. The S-MME signaling indicates quality-of-service and IP addressing for the wireless UEs. The S1 transfers signaling to the RRC indicating the quality-of-service and the IP addressing for the wireless UEs. The RRC drives wireless communications with the wireless UEs using the quality-of-service and the IP addressing as directed by the selected MME. The S1 drives data communications for the wireless UEs with the network gateways using the quality-of-service and the IP addressing from the selected MME.

Thus, the RRC in wireless access point 310 selects MMEs based on the Wireless Network Identifiers from the wireless UEs unless a UE transfers a special Establishment Cause that has been pre-associated with the media conferencing MME. Advantageously, the RRC automatically couples the wireless UEs to the special media conferencing MME responsive to a special Establishment Cause.

Figure 5:
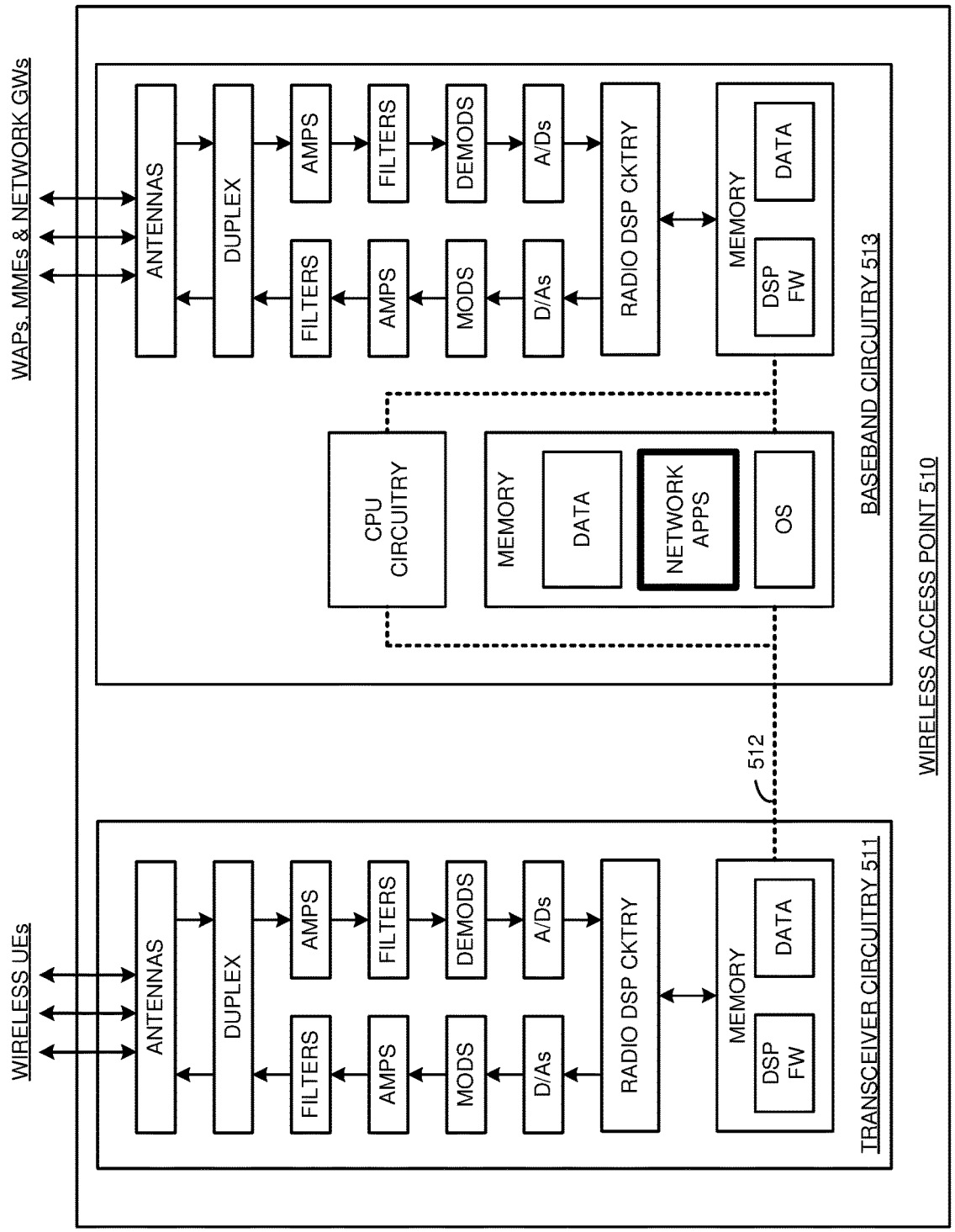
FIG. 5 illustrates hardware for a wireless access point having wireless backhaul to support media conferencing for a wireless UE.

FIG. 5 illustrates hardware for wireless access point 510 having wireless backhaul to support media conferencing for wireless UEs. Wireless access point 510 is an example of wireless access point 110, although access point 110 may have other configurations and operations. Wireless access point 510 comprises transceiver circuitry 511, data link 512, and baseband circuitry 513.

Transceiver circuitry 511 comprises antennas, duplexers, modulators, filters, AMPS, A/Ds, D/As, radio DSP circuitry, memory, and bus interfaces. The memory stores data and DSP FW. In transceiver circuitry 511, the radio DSP circuitry executes the DSP FW to drive the wireless exchange of the data with the wireless UEs. Data link 512 comprises a CPRI link, IEEE 802.3 link, IP link, or some other data coupling—including combinations thereof.

Baseband circuitry 513 comprises CPU circuitry, memory, bus interfaces, radio DSP circuitry, A/Ds and D/As, modulators and demodulators, amplifiers and filters, and duplexers and antennas. The memory stores data, operating system software, DSP FW, and network applications. In baseband circuitry 513, the CPU circuitry executes the operating system and network applications to control the exchange of the data between the wireless UEs and the network gateways (GWs) under the control of the MMEs.

Figure 6:
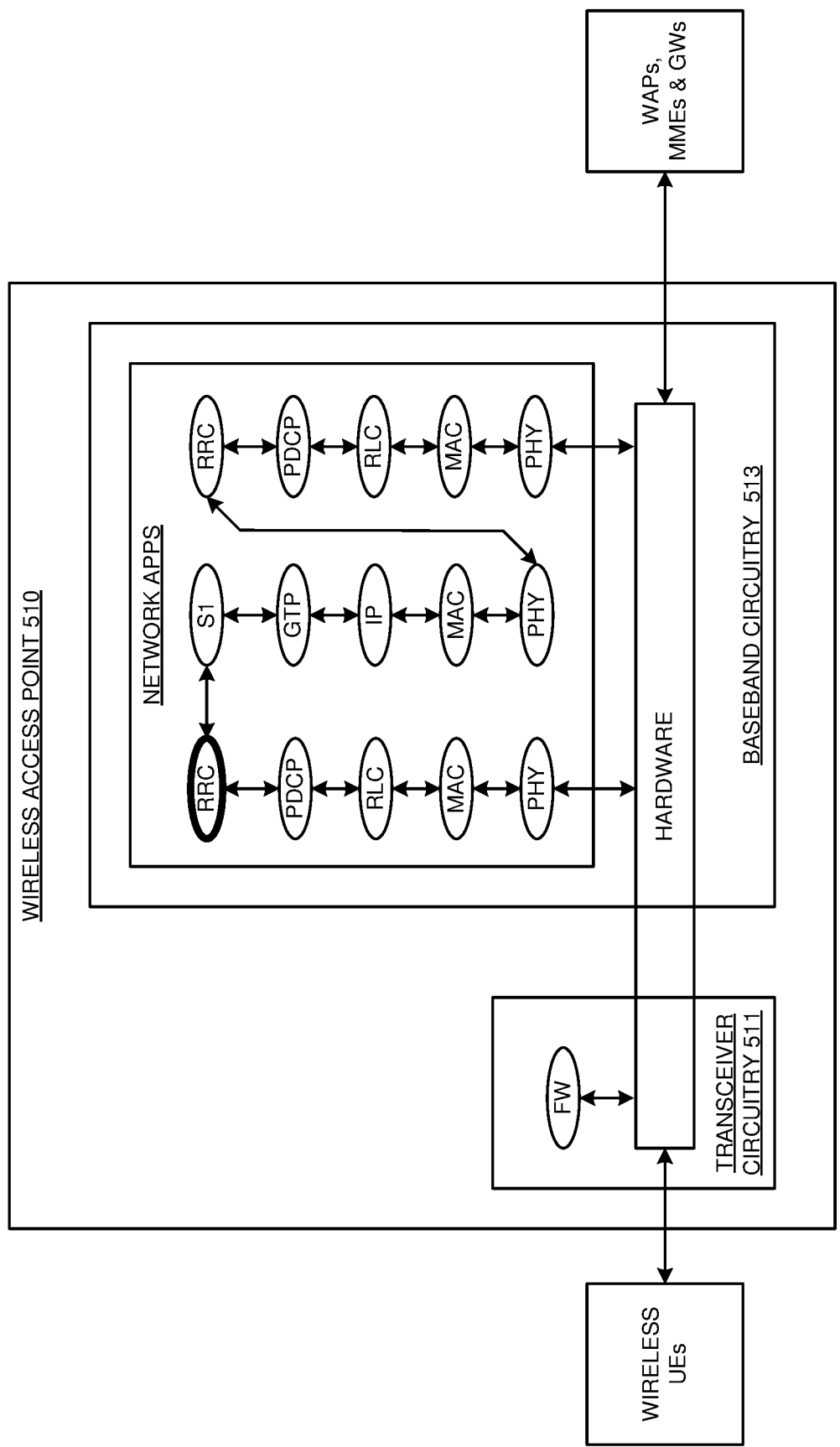
FIG. 6 illustrates software for a wireless access point having wireless backhaul to support media conferencing for a wireless UE.

FIG. 6 illustrates the network application software for wireless access point 510 having wireless backhaul to support media conferencing for wireless UEs. Wireless access point 510 is shown with transceiver circuitry 511 and baseband circuitry 513. The hardware represents the circuitry shown on FIG. 4 (DSP, CPU, bus, memory, filter, amplifier, antennas, modulation, and the like). The DSP hardware in transceiver circuitry 511 executes the FW to drive wireless data communication with the wireless UEs.

The CPU hardware in baseband circuitry 513 executes the network applications. Starting from the network-side and proceeding to the user-side, the network applications comprise a first PHY coupled to a MAC that is coupled to an RLC. The RLC is coupled to a PDCP which is coupled to an RRC. The RRC is coupled to a second PHY. The second PHY is coupled to a MAC that is coupled to an IP. The IP is coupled to a GTP that is coupled to an S1. The S1 is coupled to an RRC, and the RRC is coupled to a PDCP. The PDCP is coupled to an RLC which is coupled to a MAC. The MAC is coupled to a third PHY. In baseband circuitry 313, the PHYs call the OS to drive the hardware to support the data communications.

Referring to FIG. 5, the antennas in transceiver circuitry 513 receive a wireless signal and transfer corresponding electrical signals through the duplexer to the amplifier. The amplifier boosts the received signal for the filter which attenuates unwanted energy. A demodulator demodulates the amplified and filtered signal from the carrier frequency. An analog-to-digital converter converts the demodulated analog receive signal into a digital receive signal for the radio DSP circuitry. The radio DSP circuitry recovers data from the receive signal and transfers the recovered data to memory. The recovered data includes the user attachment signaling indicating an Establishment Cause and Wireless Network Identifier. The CPU circuitry executes the OS to process the received data through the network applications—PHY, MAC, RLC, PDCP, and RRC.

Referring to FIG. 6, the RRC determines if the Establishment Cause is pre-associated with a media conferencing MME. If the Establishment Cause is not pre-associated with the media conferencing MME, the RRC selects an MME based on the Wireless Network Identifier from the wireless UE. The RRC transfers an initial UE message to the S1 for delivery to the selected MME. The S1 transfers the initial UE signaling to the selected MME over an S1-MME link that traverses the GTP, IP, MAC, PHY, RRC, PDCP, RLC, MAC, and PHY to the baseband circuitry 313 hardware. The hardware (DSP, modulator, amplifier, filter, antennas, and the like) in baseband circuitry 513 wirelessly transfers the initial UE signaling to the selected MME.

The S1 subsequently receives S1-MME signaling from the selected MME over baseband circuitry 513 and the PHY, MAC, RLC, PDCP, RRC, PHY, MAC, IP, and GTP. The S1-MME signaling indicates quality-of-service and IP addressing for the wireless UEs. The S1 transfers signaling to the RRC indicating quality-of-service and IP addressing for the wireless UEs. The RRC drives wireless communications with the wireless UEs using the quality-of-service and the IP addressing as directed by the selected MME. The S1 drives wireless data communications with the network gateways using the quality-of-service and the IP addressing from the selected MME.

Thus, the RRC selects MMEs based on the Wireless Network Identifiers from the wireless UEs unless a UE transfers a special Establishment Cause that has been pre-associated with the media conferencing MME. Advantageously, the RRC in wireless access point 510 automatically couples the wireless UEs to the special media conferencing MME responsive to a special Establishment Cause.

Figure 7:
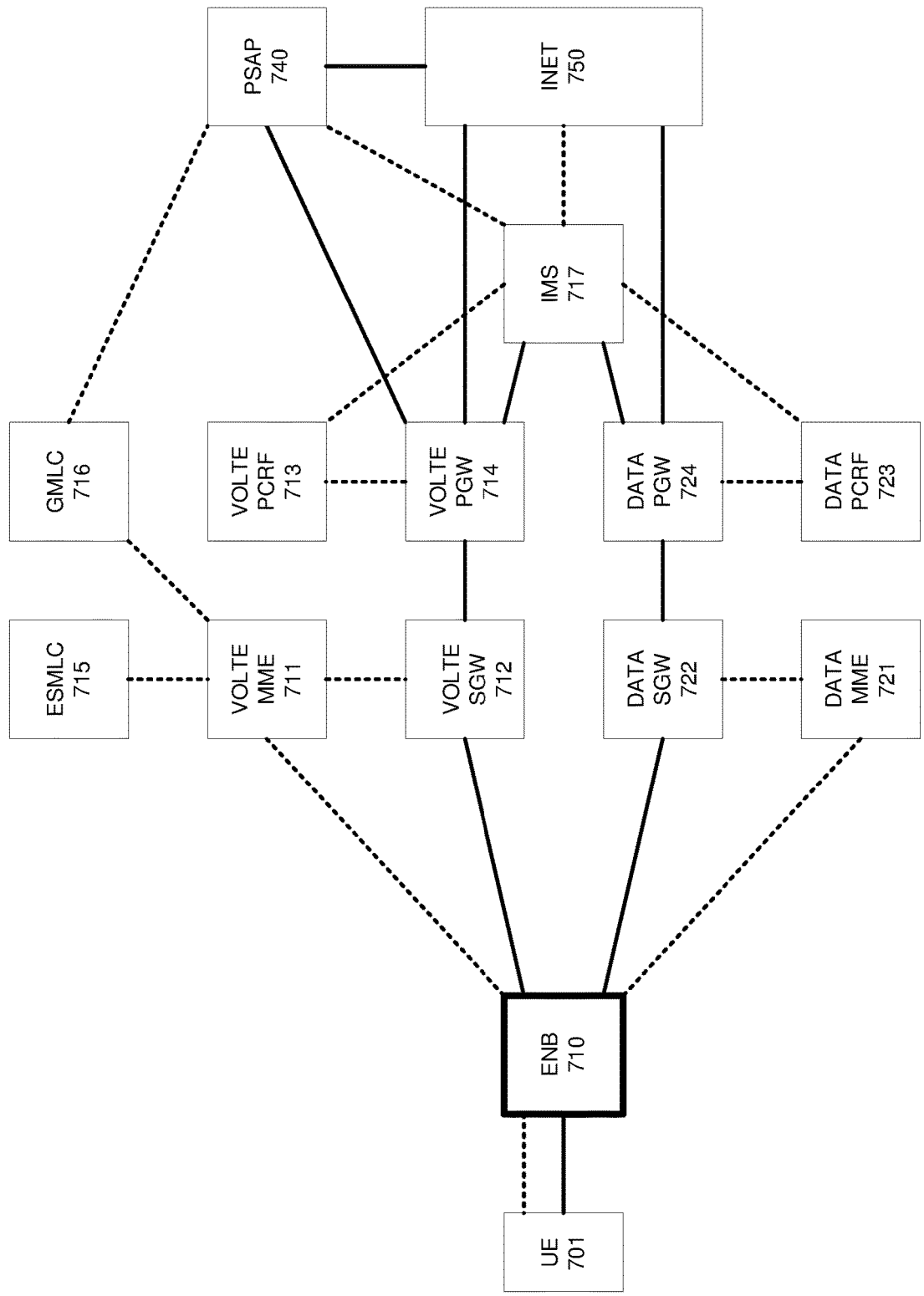
FIG. 7 illustrates a Long Term Evolution (LTE) network having an evolved NodeB to support media conferencing for a wireless UE.

FIG. 7 illustrates a Long Term Evolution (LTE) network having evolved NodeB (ENB) 710 to support media conferencing for wireless UE 701. ENB 710 comprises an example of wireless access point 110, although access point 110 may have alternative configurations and operations. The LTE network comprises ENB 710, VoLTE Mobility Management Entity (MME) 711, VoLTE Serving Gateway (SGW) 712, VoLTE Policy Charging Rules Function (PCRF) 713, VoLTE Packet Data Network Gateway (PGW) 714, evolved Service Mobile Location Center (eSMLC) 715, Global Mobile Location Center (GMLC) 716, Internet Protocol Multimedia Subsystem (IMS) 717, data MME 721, data SGW 722, data PCRF 723, and data PGW 724. Public Safety Answering Point (PSAP) 740 is coupled to GMLC 716, VoLTE PGW 714, IMS 717, and internet (INET) 750. Internet 750 is coupled to VoLTE PGW 714, IMS 717, data PGW 714, and PSAP 740.

ENB 710 wirelessly broadcasts a list of Public Land Mobile Network Identifiers (PLMN IDs). ENB 710 wirelessly exchanges RRC attachment signaling with UE 701 to synchronize the uplink and possibly the downlink for UE 701. After synchronizing UE 701, ENB 710 wirelessly exchanges RRC connect signaling with wireless UE 101 to receive an Establishment Cause and one of the PLMN IDs from UE 701.

If the Establishment Cause from UE 701 is Mobile Originated Signaling (not EMERGENCY), then ENB 710 selects data MME 721 based on the PLMN from UE 701 by using an ENB data structure that correlates individual PLMNs to individual MMEs. ENB 701 then transfers an S1-MME Initial UE message for UE 701 to data MME 721 to establish the non-emergency data session. Data MME 721 signals data SGW 722 which signals data PGW 724. PGW 724 interacts with data PCRF 723 to establish an IP address and Quality-of-Service (QoS) for UE 701. PGW 724 responds to MME 711 with the IP address and QoS which responds to ENB 710 with the IP address and QoS. ENB 710 wirelessly transfers the IP address and QoS to UE 701 over the RRC link. UE 701 and INET 750 then exchange user data over ENB 710, data SGW 722, data PGW 724 using the QoS. PGW 724 usually translates the IP address for UE 701.

UE 701 may register with IMS 717 over data PGW 724 or internet 750. UE 701 may place VoLTE calls where the Session Initiation Protocol (SIP) signaling traverses ENB 710, data SGW 722, data PGW 724, IMS 717, and IMS Internet 750. On these VoLTE calls, the voice data traverses ENB 710, data SGW 722, data PGW 724, and Internet 750. Note that UE 701 may place a VoLTE call to PSAP 740 over IMS 717 and INET 750 in this manner.

If the Establishment Cause from UE 701 is EMERGENCY, then ENB 710 selects VoLTE MME 711 based on the Establishment Cause by using an ENB data structure that correlates the Establishment Cause Emergency to VoLTE MME 711 (without using a PLMN). ENB 710 then transfers an S1-MME Initial UE message for UE 701 to VoLTE MME 711 to establish the emergency data session. VoLTE MME 711 signals VoLTE SGW 712 which signals VoLTE PGW 714. PGW 714 interacts with VoLTE PCRF 713 to establish the IP address and VoLTE QoS for UE 701. VoLTE PGW 724 responds to VoLTE MME 711 with the IP address and QoS which responds to ENB 710 with the IP address and QoS. ENB 710 wirelessly transfers the IP address and QoS to UE 701 over the RRC link.

UE 701 and INET 750 may then exchange user data over ENB 710, VoLTE SGW 722, VoLTE PGW 724, and internet 750 using the QoS. UE 701 registers with IMS 717 over ENB 710, VoLTE SGW 712, and VoLTE PGW 714. UE 701 then places an EMERGENCY VoLTE call where the SIP signaling traverses ENB 710, VoLTE SGW 712, VoLTE PGW 714, IMS 717, and PSAP 740. On these VoLTE calls, the voice data traverses ENB 710, VoLTE SGW 712, VoLTE PGW 714, and PSAP 740. On these VoLTE calls, VoLTE MME 711 interacts with ESMLC 715 to direct GMLC 716, and GMLC 716 provides the geographic location of UE 701 to PSAP 740. Advantageously, VoLTE MME 711 has signaling interfaces to ESMLC 715 and GMLC 716 that data MME 721 does not have.

ENB 710 selects data MME 721 based on the PLMN IDs from UE 701, unless UE 701 transfers an EMERGENCY Establishment Cause. Advantageously, ENB 710 automatically couples UE 701 to VoLTE MME 711 responsive to the EMERGENCY Establishment Cause from UE 701. ENB 710 does not use the PLMN to select the MME when the EMERGENCT Establishment Cause is used by UE 701.

The configurations and operations of FIG. 7 would also apply to Video over LTE (ViLTE) MMEs, ViLTE SGWs, and ViLTE PGWs. In a ViLTE example when the Establishment Cause from UE 701 is EMERGENCY, the ENB 710 selects a ViLTE MME based on the Establishment Cause without using the PLMN from UE 701. ENB 710 then transfers an S1-MME Initial UE message for UE 701 to the ViLTE MME to establish the emergency data session. The ViLTE MME would signal the ViLTE SGW which would signal the ViLTE PGW. The ViLTE PGW interacts with ViLTE PCRF to establish the IP address and ViLTE QoS for UE 701. The ViLTE PGW responds to the ViLTE MME with the IP address and QoS which responds to ENB 710 with the IP address and QoS. UE 701 could place an EMERGENCY ViLTE call where the SIP signaling traverses ENB 710, the ViLTE SGW, the ViLTE PGW, IMS 717, and PSAP 740. On these ViLTE calls, the video data traverses ENB 710, the ViLTE SGW, the ViLTE PGW, and PSAP 740. Advantageously, ENB 710 would automatically couple UE 701 to the ViLTE MME responsive to the EMERGENCY Establishment Cause without using the PLMN.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless access point to support special media conferencing requiring a signaling interface to a mobility location center for a wireless User Equipment (UE), the method comprising:
   a Fifth Generation New Radio (5GNR) transceiver wirelessly exchanging timing signaling with the wireless UE to synchronize the wireless UE;
   in response to the synchronization of the wireless UE, baseband circuitry exchanging connect signaling with the wireless UE over the 5GNR transceiver to receive an Establishment Cause and a Public Land Mobile Network Identifier (PLMN ID) from the wireless UE;
   the baseband circuitry determining when the Establishment Cause is associated with the special media conferencing requiring the signaling interface to the mobility location center;
   when the Establishment Cause is associated with the special media conferencing requiring the signaling interface to the mobility location center, the baseband circuitry selecting a media conferencing MME having the signaling interface to the mobility location center and exchanging network signaling for the wireless UE with the media conferencing MME having the signaling interface to the mobility location center; and
   the baseband circuitry exchanging media conference data with the wireless UE over the 5GNR transceiver under control of the media conferencing MME having the signaling interface to the mobility location center, wherein the baseband circuitry executes a Radio Resource Control (RRC) and the RRC automatically couples the wireless UE to the media conferencing MME responsive to the Establishment Cause without using the PLMN ID, and wherein the media conferencing MME comprises one of a Voice-over-Long Term Evolution (VoLTE) MME or a Video-over-Long Term Evolution (ViLTE) MME and the Establishment Cause comprises an emergency Establishment Cause.

2. The method of claim 1 wherein the Establishment Cause that is associated with the media conferencing MME comprises an Emergency Establishment Cause.

3. The method of claim 1 wherein the Establishment Cause that is associated with the media conferencing MME comprises a Non-Internet Protocol Signaling Establishment Cause.

4. The method of claim 1 wherein the signaling interface to the mobility location center comprises a signaling interface to a Gateway Mobility Location Center (GMLC).

5. The method of claim 1 wherein the signaling interface to the mobility location center comprises a signaling interface to an evolved Service Mobility Location Center (eSMLC).

6. A wireless access point to support special media conferencing requiring a signaling interface to a mobility location center for a wireless User Equipment (UE), the wireless access point comprising:
   a Fifth Generation New Radio (5GNR) transceiver configured to wirelessly exchange timing signaling with the wireless UE to synchronize the wireless UE;
   in response to the synchronization of the wireless UE, baseband circuitry configured to exchange connect signaling with the wireless UE over the 5GNR transceiver to receive an Establishment Cause and a Public Land Mobile Network Identifier (PLMN ID) from the wireless UE;
   the baseband circuitry configured to determine when the Establishment Cause is associated with the special media conferencing requiring the signaling interface to the mobility location center;
   the baseband circuitry configured to select a media conferencing Mobility Management Entity (MME) having the signaling interface to the mobility location center when the Establishment Cause is associated with the special media conferencing requiring the signaling interface to the mobility location center;
   the baseband circuitry configured to exchange network signaling for the wireless UE with the media conferencing MME having the signaling interface to the mobility location center; and
   the baseband circuitry configured to exchange media conference data with the wireless UE over the 5GNR transceiver under control of the media conferencing MME having the signaling interface to the mobility location center, wherein the baseband circuitry is configured to execute a Radio Resource Control (RRC) and the RRC is configured to automatically couple the wireless UE to the media conferencing MME responsive to the Establishment Cause without using the PLMN ID, and wherein the media conferencing MME comprises one of a Voice-over-Long Term Evolution (VoLTE) MME or a Video-over-Long Term Evolution (ViLTE) MME and the Establishment Cause comprises an emergency Establishment Cause.

7. The wireless access point of claim 6 wherein the Establishment Cause that is associated with the media conferencing MME comprises an Emergency Establishment Cause.

8. The wireless access point of claim 6 wherein the Establishment Cause that is associated with the media conferencing MME comprises a Non-Internet Protocol Signaling Establishment Cause.

9. The wireless access point of claim 6 wherein the signaling interface to the mobility location center comprises a signaling interface to a Gateway Mobility Location Center (GMLC).

10. The wireless access point of claim 6 wherein the signaling interface to the mobility location center comprises a signaling interface to an evolved Service Mobility Location Center (eSMLC).

* * * * *